US011152165B2

(12) United States Patent
Kim et al.

(10) Patent No.: US 11,152,165 B2
(45) Date of Patent: Oct. 19, 2021

(54) SWITCHING MODULE CONNECTION STRUCTURE

(71) Applicant: HYOSUNG HEAVY INDUSTRIES CORPORATION, Seoul (KR)

(72) Inventors: Byoung Choul Kim, Incheon (KR); Young Hwan Chung, Changwon-si Gyeongsangnam-do (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/967,028

(22) PCT Filed: Dec. 21, 2018

(86) PCT No.: PCT/KR2018/016413
§ 371 (c)(1),
(2) Date: Aug. 3, 2020

(87) PCT Pub. No.: WO2019/151648
PCT Pub. Date: Aug. 8, 2019

(65) Prior Publication Data

US 2021/0043397 A1 Feb. 11, 2021

(30) Foreign Application Priority Data

Feb. 5, 2018 (KR) ........................ 10-2018-0014128

(51) Int. Cl.
*H02M 1/42* (2007.01)
*H01H 9/54* (2006.01)

(52) U.S. Cl.
CPC .................................... *H01H 9/54* (2013.01)

(58) Field of Classification Search
CPC ........................................................ H01H 9/54
See application file for complete search history.

(56) References Cited

U.S. PATENT DOCUMENTS

| | | | | |
|---|---|---|---|---|
| 2011/0157944 A1* | 6/2011 | Jiang | H02M 7/53871 | |
| | | | 363/127 | |
| 2014/0049230 A1* | 2/2014 | Weyh | H02M 7/483 | |
| | | | 323/207 | |
| 2020/0112166 A1* | 4/2020 | Chung | H01H 33/596 | |
| 2020/0358280 A1* | 11/2020 | Kim | H01H 33/59 | |

FOREIGN PATENT DOCUMENTS

| | | | |
|---|---|---|---|
| JP | 2002-518858 | A | 6/2002 |
| KR | 10-2006-0123729 | A | 12/2006 |
| KR | 10-1558862 | B1 | 10/2015 |
| KR | 10-2016-0048877 | A | 5/2016 |
| WO | 2011-057675 | A1 | 5/2011 |
| WO | 2016-084136 | A1 | 6/2016 |

* cited by examiner

*Primary Examiner* — Jared Fureman
*Assistant Examiner* — Esayas G Yeshaw
(74) *Attorney, Agent, or Firm* — Novick, Kim & Lee, PLLC; Jae Youn Kim

(57) ABSTRACT

A connection structure of a plurality of switching modules that reduces required insulation voltage significantly when the plurality of switching modules is connected to each other in series is proposed. A switching module connection structure includes: n (n≥1, integer) switching modules arranged in two or more columns and all connecting to each other in series from a first switching module in a first column to a last switching module in a last column; and insulating members disposed between at least some switching modules for each column.

6 Claims, 3 Drawing Sheets

SWITCHING MODULE CONNECTION STRUCTURE

TECHNICAL FIELD

The present disclosure relates to a switching module connection structure and, more particularly, to a connection structure of a plurality of switching modules that significantly reduces required insulation voltage when the plurality of switching modules is connected to each other in series.

BACKGROUND ART

In general, various switching modules are used to control a flow of current in an electrical line. For example, in the case of a DC circuit breaker, a mechanical switch or a semiconductor switch for power may be used to block a fault current flowing in a DC line. Obviously, it is also possible to mix and use the above mentioned switches for blocking of high voltage DC.

In a high voltage environment, a plurality of switching modules such as the semiconductor switch for power is used by way of connecting to each other in series. For example, International Patent Application Publication No. WO2011/057675 has a structure in which a plurality of switching modules is connected to each other in series. In addition, Korean Patent No. 1558862 discloses a structure in which a plurality of switching modules (i.e., submodules) is connected to each other in series.

FIG. 1 is a view schematically showing a connection structure of a plurality of switching modules according to the related art. The related art has a structure in which the plurality of switching modules is connected to each other in series. In this way, when the plurality of switching modules is connected to each other in series in the high voltage environment, predetermined insulation is required between each of the switching modules.

However, when the plurality of switching modules is connected in series adjacent to each other in the related art, there is a problem in that the required insulation voltage becomes very high. In addition, when all the plurality of switching modules are connected to each other in series, the length of the entire connection structure becomes long, thereby causing a disadvantage in that a large space is required to accommodate the switching modules.

DISCLOSURE

Technical Problem

The present disclosure has been proposed to solve the problems of the related art described above, and an objective of the present disclosure is to provide a new switching module connection structure for lowering required insulation voltage in a plurality of switching modules connected to each other in series.

In addition, another objective of the present disclosure is to change the connection structure of the switching modules to reduce the total space by shortening a connection length than that of the conventional switching modules.

Technical Solution

A switching module connection structure according to exemplary embodiments of the present invention includes: n ($n \geq 1$, integer) switching modules arranged in two or more columns and all connecting to each other in series from a first switching module in a first column to a last switching module in a last column; and insulating members disposed between at least some switching modules for each column.

In the present invention, the switching modules in the two or more columns may be arranged in parallel to each other.

In the present invention, the n switching modules may be grouped by a plurality of switching module groups composed of m ($m<n$, integer) switching modules for each column, and each of the insulating members may be inserted between the switching module groups.

In the present invention, the m switching modules in each switching module group may be directly connected to each other in series, and an uppermost switching module of the m switching modules may be serially connected to a lowermost switching module in any one switching module group of an adjacent column.

In the present invention, in the switching modules arranged in the two or more columns, the uppermost switching module of a k-th switching module group in each of the switching module groups of the first column may be serially connected to the lowermost switching module of a k-th switching module group of an adjacent second column, and the lowermost switching module of the k-th switching module group in each of the switching module groups of the first column may be serially connected to the uppermost switching module of a (k+1)-th switching module group of the second column.

In the present invention, in the switching modules arranged in the two or more columns, the uppermost switching module of a k-th switching module group in each of the switching module groups of the first column may be serially connected to the lowermost switching module of a (k−1)-th switching module group of a second column adjacent to a left side of the first column, and the lowermost switching module of the k-th switching module group in each of the switching module groups of the first column may be serially connected to the uppermost switching module of a (k+1)-th switching module group of a third column adjacent to a right side of the first column.

In the present invention, the first switching module of the first column and the last switching module of the last column may be respectively connected to a DC line.

In the present invention, the switching module connection structure may further include a rack structure provided with a first space for mounting the switching modules in order to stack the switching modules arranged in the two or more columns and a second space for mounting the insulating members, wherein the switching modules and the insulating members may be respectively mounted in the first space and the second space of the rack structure in a state of being vertically stacked.

Advantageous Effects

According to the present disclosure, it is possible to lower the required insulation voltage in the plurality of switching modules connected to each other in series.

In addition, according to the present disclosure, by shortening the length of the switching modules, it is possible to reduce the total space and size of a device or equipment that applies the switching modules.

MODE OF INVENTION

Figure 1:
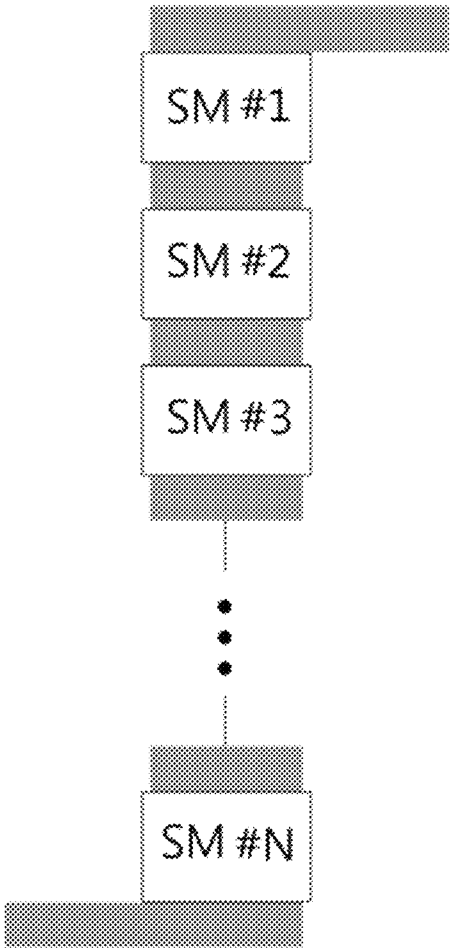
FIG. 1 PRIOR ART
FIG. 1 is a view showing a conventional connection structure of a plurality of switching modules.

Hereinafter, exemplary embodiments of the present disclosure are described in detail with reference to the accompanying drawings. In adding reference numerals to the components of each drawing, it should be noted that the same reference numerals are used to refer to the same components as much as possible even if displayed on different drawings. Further, in the following description, if it is decided that the detailed description of a known function or configuration related to the disclosure makes the subject matter of the disclosure unclear, the detailed description is omitted.

In addition, when describing the components of the present disclosure, terms such as first, second, A, B, (a), or (b) may be used. Since these terms are provided merely for the purpose of distinguishing the components from each other, they do not limit the nature, sequence, or order of the components. If a component is described as being "connected", "coupled", or "linked" to another component, that component may be directly connected or connected to that other component. However it should be understood that yet another component between each of the components may be "connected", "coupled", or "linked" to each other.

Figure 2:
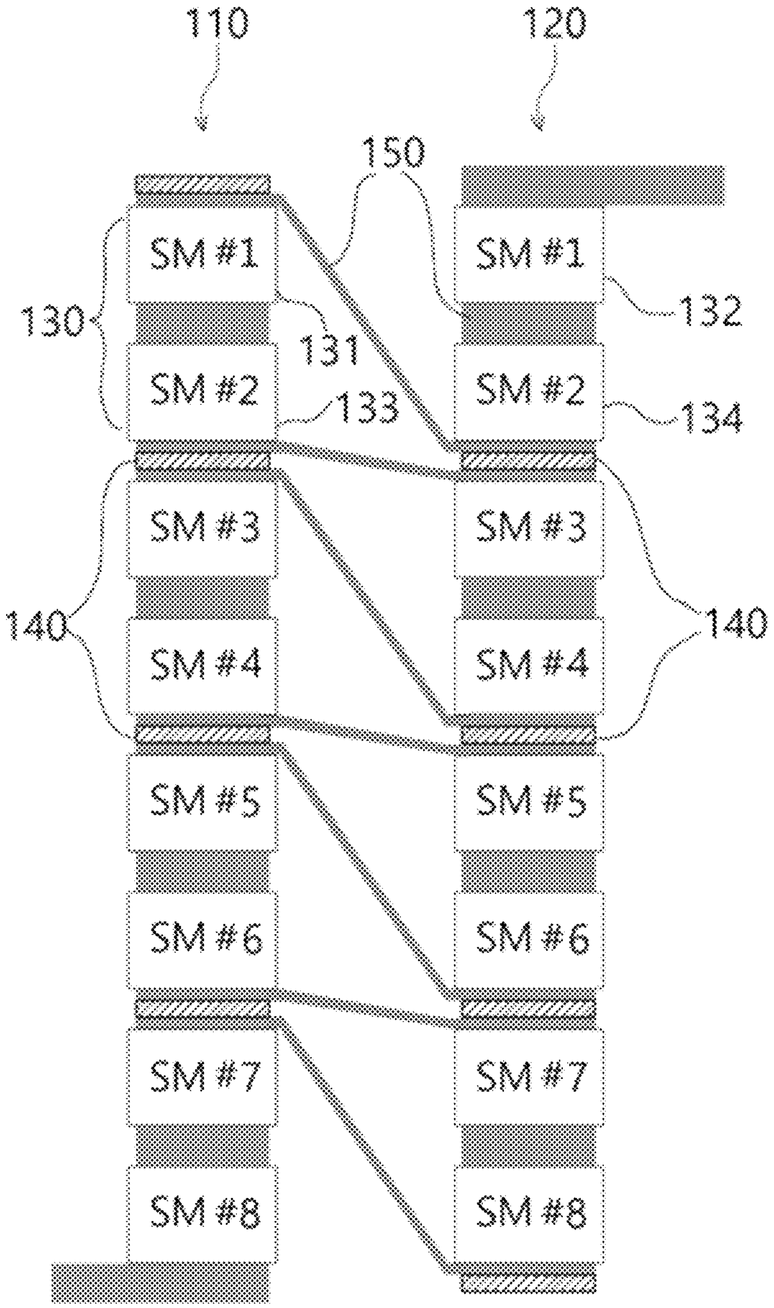
FIG. 2 is view showing a connection structure of switching modules according to an exemplary embodiment of the present disclosure.
Figure 3:
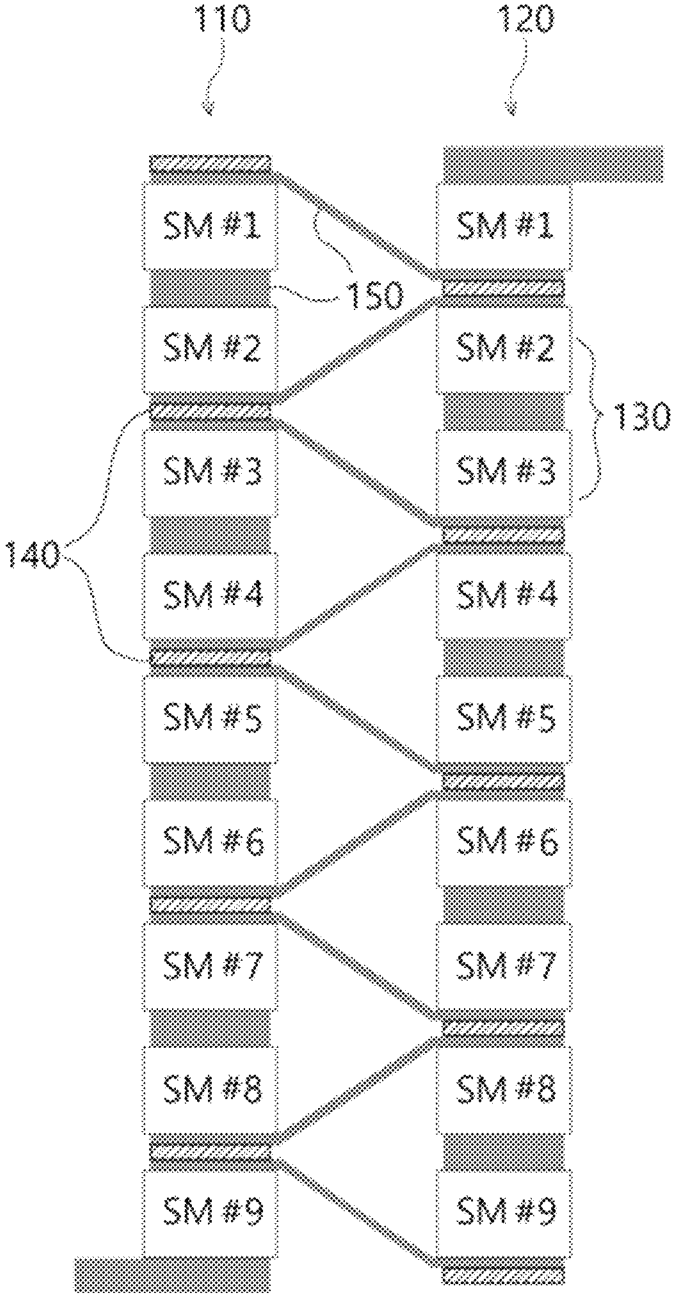
FIG. 3 is view showing a connection structure of switching modules according to another exemplary embodiment of the present disclosure.

FIG. 2 is view showing a connection structure of switching modules according to an exemplary embodiment of the present disclosure, and FIG. 3 is view showing a connection structure of switching modules according to another exemplary embodiment of the present disclosure.

Referring to the drawings, n (n≥2, integer) switching modules are arranged in two or more columns, and each column is preferably arranged in parallel to each other with the same length. For example, assuming that n=36, when 36 switching modules are arranged in two columns, 18 switching modules may be arranged in parallel to each other in each column; when 36 switching modules are arranged in three columns, 12 switching modules may be arranged in parallel to each other in each column; and when 36 switching modules are arranged in four columns, 9 switching modules may be arranged in parallel to each other in each column.

In such an arrangement, the switching modules may be arranged in parallel in two or more columns horizontally, or may be arranged by being stacked vertically at a predetermined height, as necessary. The arrangement type of the switching modules is determined depending on a space for the arrangement or a type of connected devices.

At this time, in the switching module arranged in two or more columns, the first switching module in the first column and the last switching module in the last column may be connected to, for example, a power line. For example, when the plurality of switching modules are applied to a DC circuit breaker, the first switching module in the first column and the last switching module in the last column may be connected to a DC line.

The switching modules are respectively grouped to be a plurality of switching module groups composed of m (m<n, integer) switching modules among n switching modules, and insulation members are respectively inserted between the switching module groups.

Here, the m switching modules in a switching module group are directly connected to each other in series, but the outermost switching module of the m switching modules is serially connected to the outermost switching module in any one switching module group in a right next adjacent column.

At this time, all then switching modules arranged in two or more columns are made to be connected to each other in series from the first switching module in the first column to the last switching module in the last column. In addition, the insulating member is disposed between at least some switching modules for each column, but preferably, the insulating member is to be inserted between each of the switching module groups.

The connection structure of the switching module will be described in detail with reference to FIGS. 2 and 3.

FIG. 2 is a view showing an example in which 16 switching modules are stacked and arranged vertically side by side in parallel in two columns of eight by eight, and FIG. 3 is a view showing an example in which 18 switching modules are stacked and arranged vertically side by side in parallel in two columns of nine by nine.

However, these views are illustratively shown for convenience of explanation, and obviously, the switching modules may be arranged in three or more columns or may be horizontally arranged, as described above.

In FIG. 2, the 16 switching modules are divided into a first column 110 and a second column 120 and stacked side by side. Each column 110 and 120 is composed of eight switching modules SM, and eight switching modules for each column 110 and 120 are respectively grouped by two switching modules, thereby being divided into four switching module groups 130.

The two switching modules in the four switching module groups 130 are also connected to each other in series. In addition, among these two switching modules, an upper switching module is serially connected 150 to a lower switching module of an adjacent column, and a lower switching module is serially connected 150 to an upper switching module of the adjacent column. Hereby, the 16 switching modules arranged in two columns are connected to each other in series, as a whole.

In this way, the two switching modules in each switching module group 130 of the first column 110 and the second column 120 are directly connected to each other in series; the uppermost switching module 131 among the two switching modules in the first switching module group of the first column 110 is serially connected to the lowermost switching module 134 in the first switching module group of the adjacent second column 120, and the lowermost switching module 133 among the two switching modules in the first switching module group of the first column 110 is connected to the uppermost switching module 132 in the second switching module group of the second column 120. Hereby, all the switching modules are connected to each other in series from the first switching module in the first column 110 to the last switching module in the second column 120.

In the case where, as another example, each switching module group 130 is grouped by three switching modules, these three switching modules are directly connected to each other in series, and the uppermost switching module among the three switching modules in a switching module group 130 of the first column 110 is serially connected to the lowermost switching module among the three switching modules in a switching module group 130 of the second column 120. The reverse case is also true. That is, the uppermost switching module among the three switching modules in the switching module group 130 in the second column 120 is serially connected to the lowermost switching module among the three switching modules in the switching module group 130 in the first column 110.

Through these connections, all the 16 switching modules are connected to each other in series, from the uppermost switching module of the first column 110 to the lowermost switching module of the second column 120.

Here, the main point is that the insulating members 140 are respectively installed between the switching module groups 130 in the first and second columns 110 and 120. The insulating member 140 is for maintaining insulation between the switching module groups 130. This insulation has an effect of lowering the required insulation voltage of the plurality of switching modules as a whole connected to each other in series.

Meanwhile, in the exemplary embodiments of the present disclosure, each switching module may be mounted on a rack structure (not shown) in order to smoothly and stably arrange the n switching modules. Such a rack structure is formed of a first space for mounting and stacking the switching modules arranged in two or more columns and a second space for mounting the insulating members. Therefore, the n switching modules and the plurality of insulating members may be vertically stacked by being respectively mounted in the first space and the second space of the rack structure.

In the example of FIG. 2, each of the eight switching modules for each column is mounted one by one in the first space of the rack structure, and the insulating members are mounted in the second space provided between the switching module groups composed of two switching modules. The number of second spaces is determined by the number of switching module groups.

Even when an odd number of switching modules are provided for each column 110 and 120 as shown in another example of FIG. 3, the same as described above in FIG. 2 is to be applied. However, since there are odd number of switching modules in each column, a specific switching module group 130 may include only one switching module. Even when one switching module is included in the switching module group, the switching module is connected to other switching module in series, so that all the switching modules are connected to each other in series as a whole.

FIGS. 2 and 3 show a case in which 16 switching modules are arranged in two columns as an example, but in the present disclosure, the switching modules may also be arranged by stacking the switching modules side by side in three or more columns.

In this case, the switching modules in the switching module group 130 are directly connected to each other in series through an output terminal; the upper switching module among these switching modules is serially connected to the lower switching module of adjacent column; and the lower switching module is serially connected to the upper switching module of the adjacent column. Thus, all the switching modules arranged in three columns are connected to each other in series.

Specifically, the uppermost switching module among the switching modules in each switching module group of the first column is serially connected to the lowermost switching module in a switching module group of an adjacent second column; the lowermost switching module is serially connected to the uppermost switching module in a switching module group of another adjacent third column; and all the switching modules from the first switching module in the first column to the last switching module in the third column are connected to each other in series. Obviously, even in this case, each of the insulating members is inserted between the switching module groups for each column.

In the description above, although the components of the embodiments of the present disclosure may have been explained as assembled or operatively connected as a unit, the present disclosure is not intended to limit itself to such embodiments. That is, within the scope of the present disclosure, all of the components may be selectively combined and operated in any numbers. In addition, the terms "comprise", "include", or "have" described above mean that the corresponding component may be inherent unless otherwise stated, and thus it should be construed that it may further include other components, not to exclude other components. That is, terms like "include", "comprise", and "have" should be interpreted in default as inclusive or open rather than exclusive or closed unless expressly defined to the contrary. In the following description, unless otherwise defined, all terms including technical and scientific terms used herein have the same meaning as commonly understood by one of those skilled in the art to which this disclosure belongs. Commonly used terms, such as predefined terms, should be interpreted as being consistent with the contextual meaning of the related art, and are not to be interpreted as ideal or excessively formal meanings unless explicitly defined in the present disclosure.

Although exemplary aspects of the present disclosure have been described for illustrative purposes, those skilled in the art will appreciate that various modifications, additions and substitutions are possible, without departing from essential characteristics of the disclosure. Therefore, the embodiments disclosed in the present disclosure are not intended to limit the technical idea of the present disclosure but to describe the present disclosure, and the scope of the technical idea of the present disclosure is not limited by these embodiments. The scope of protection of the present disclosure should be interpreted by the following claims, and all technical ideas within the scope equivalent thereto should be construed as being included in the scope of the present disclosure.

The invention claimed is:

1. A switching module connection structure comprising:

n ($n \geq 1$, integer) switching modules arranged in two or more columns and all connecting to each other in series from a first switching module in a first column to a last switching module in a last column; and insulating members disposed between at least two switching modules for each column, wherein the n switching modules are grouped by a plurality of switching module groups composed of m ($m<n$, integer) switching modules for each column, and each of the insulating members is inserted between the switching module groups, and wherein the m switching modules in each switching module group are directly connected to each other in series, and an uppermost switching module of the m switching modules is serially connected to a lowermost switching module in any one switching module group of an adjacent column.

2. The switching module connection structure of claim 1, wherein the switching modules in the two or more columns are arranged in parallel to each other.

3. The switching module connection structure of claim 1, wherein, in the switching modules arranged in the two or more columns, the uppermost switching module of a k-th switching module group in each of the switching module groups of the first column is serially connected to the lowermost switching module of a k-th switching module group of an adjacent second column, and the lowermost switching module of the k-th switching module group in each of the switching module groups of the first column is serially connected to the uppermost switching module of a (k+1)-th switching module group of the second column.

4. The switching module connection structure of claim 1, wherein, in the switching modules arranged in the two or more columns, the uppermost switching module of a k-th switching module group in each of the switching module groups of the first column is serially connected to the lowermost switching module of a (k−1)-th switching module group of a second column adjacent to a left side of the first column, and the lowermost switching module of the k-th switching module group in each of the switching module groups of the first column is serially connected to the uppermost switching module of a (k+1)-th switching module group of a third column adjacent to a right side of the first column.

5. The switching module connection structure of claim 1, wherein the first switching module of the first column and the last switching module of the last column are respectively connected to a DC line.

6. The switching module connection structure of claim 1, further comprising:

a rack structure provided with a first space for mounting the switching modules in order to stack the switching modules arranged in the two or more columns and a second space for mounting the insulating members, wherein the switching modules and the insulating members are respectively mounted in the first space and the second space of the rack structure in a state of being vertically stacked.

* * * * *